United States Patent [19]

Kitaoka et al.

[11] Patent Number: 5,576,896
[45] Date of Patent: Nov. 19, 1996

[54] STRUCTURE FOR ATTACHING A LENS TO PREVENT DISTORTION FROM CHANGES IN THE AMBIENT CONDITIONS

[75] Inventors: Naoki Kitaoka, Sakura; Keiji Ohsawa, Tokyo, both of Japan

[73] Assignee: Nikon Corporation, Tokyo, Japan

[21] Appl. No.: 354,170

[22] Filed: Dec. 8, 1994

[30] Foreign Application Priority Data

Dec. 29, 1993 [JP] Japan .................................. 5-351711

[51] Int. Cl.⁶ .................................................. G02B 7/02
[52] U.S. Cl. ............................................ 359/813; 359/820
[58] Field of Search .................................. 359/813, 822, 359/820, 814; 354/406, 407, 408

[56] References Cited

U.S. PATENT DOCUMENTS

| | | | |
|---|---|---|---|
| 4,526,458 | 7/1985 | Kawamara | 354/406 |
| 4,662,735 | 5/1987 | Karasaki et al. | 354/406 |
| 5,311,004 | 5/1994 | Kusaka | 250/201.8 |

FOREIGN PATENT DOCUMENTS

| | | |
|---|---|---|
| 61-165712 | 1/1985 | Japan . |
| 61-165711 | 1/1985 | Japan . |
| 1-92707 | 5/1987 | Japan . |
| 5-107062 | 10/1991 | Japan . |

Primary Examiner—Georgia Y. Epps
Assistant Examiner—Ricky Mack

[57] ABSTRACT

Fitting holes are formed on a line of extension or a substantially vertical bisector in an arranging direction of a pair of lenses of a plastic plate formed integrally with at least the pair of lenses. Correspondingly, bosses are formed protruding from a base body using an adherable material so that a height thereof is larger than a sum of a thickness of the plastic plate and a thickness of a stop plate. Even after attaching the stop plate and the plastic plate to the base body, the bosses are protrudable from the plastic plate. Thus, the plastic plate and the stop plate are fixed in a sandwiched state between the base body and an adhesive agent. The plastic lens having a poor adhesion with the adhesive agent can be surely fixed without increasing the number of parts, and an instability of a positional accuracy due to environmental changes is obviated.

13 Claims, 5 Drawing Sheets

STRUCTURE FOR ATTACHING A LENS TO PREVENT DISTORTION FROM CHANGES IN THE AMBIENT CONDITIONS

BACKGROUND OF THE INVENTION

1. Field of the Invention

The present invention relates generally to a lens fixing structure suitable for use when fixedly holding a plastic lens or the like and, more particularly, to a plastic lens fixing structure capable of ensuring a high accuracy against changes in ambient environment, especially, variations in terms of temperature and humidity in the case of requiring a compact configuration and a positional accuracy as in a focus detecting device of a camera, etc.

2. Related Background Art

A variety of principles about, e.g., a focus detecting method have hitherto been proposed. The fundamental principle thereof will be, however, explained briefly with reference to FIG. 8 with respect to the focus detecting device in such a form that images formed by a plurality of lenses are compared by arranging the plurality of lenses at a fixed interval.

That is, the numeral 10 in FIG. 8 designates an exit pupil of a photographing lens. The exit pupil 10 of this photographing lens is partitioned into a plurality of areas 91, 92. A field mask 20 is provided in the vicinity of a predetermined focal point of the photographing lens. A condenser lens 30 is disposed in rear of this field mask 20.

Further, a stop mask 40 provided posterior to this condenser lens 30 forms a pair of apertures 41, 42 corresponding to the two areas 91, 92 of the exit pupil 10 of the photographing lens. Provided in rear of the stop mask 40 is a plate-like member 50 serving as a re-imaging lens having a pair of re-imaging lens elements 51, 52 corresponding to the apertures 41, 42. Disposed posterior to this plate member 50 is a photoelectric converting element array 60 serving as a focus detecting unit including a pair of light receiving elements 61, 62 for re-forming light beams penetrating the lens elements 51, 52 as secondary images. Note that the symbol O represents an optical axis of the photographing lens.

Then, in the above-described configuration, the light beams passing through the areas 91, 92 of the exit pupil 10 of the photographing lens form a primary image in the vicinity of the field mask 20. Also, this field mask 20 regulates the light beams toward the condenser lens 30 and thus regulates a focus detection area.

Further, unnecessary light beams of those penetrating the condenser lens 30 are regulated by the apertures 41, 42 of the stop mask 40, which correspond to the areas 91, 92 of the exit pupil 10. Then, the light beams traveling through these apertures 41, 42 are re-imaged as secondary images on the light receiving elements 61, 62 of the photoelectric converting element array 60 through the lens elements 51, 52 of the plate member 50. A focusing state is detected from a relative positional deviation quantity between these secondary images.

By the way, the above-mentioned member having the plurality of lenses, e.g., the plate member 50 serving as the re-imaging lens is integrally formed of a typical plastic lens material such as an acrylic resin, a polystyrene resin and a polycarbonate resin. In this case, there is induced a problem in which a shape of the lens is deformed due to an influence of changes in the using environment such as a temperature and a humidity, resulting in an occurrence of error when detecting the focal point.

For example, the plastic materials given above generally exhibit a linear expansion coefficient larger by 3–4 digits ($6\times10^{-5}/°$ C. in the case of, e.g., the acrylic resin) than that of a glass material with respect to the changes in temperature. The influence by the linear expansion coefficient is therefore unignorable.

Further, the plastic material stated above are rich in terms of a hygroscopicity and a permeability and therefore have such a nature that they are easy to expand with an increase in the humidity.

FIG. 9 shows one example of an influence exerted by environmental changes such as changes in temperature and humidity on the focus defection system based on the fundamental principle described above.

Explaining it briefly, to start with, the light beams reach positions 61A, 61B; 62A, 62B on a photoelectric converting element array 60 having light receiving elements 61, 62 in an initial state in FIG. 9. Herein, the symbols A, B designate the light beams passing through the same point on a primary imaging surface, and a 61A–62A interval is equal to a 61B–62B interval.

Further, herein, the plate member 50 is located at a lower edge in the FIG. 9 when attaching the plate member 50, i.e., the block lower edge of the plate member 50 serves as a fixed edge (FIX).

In such a state, however, a configurational variation derived from an expansion is produced due to the ambient environmental (temperature, humidity) changes. An exit angle of the light beams from a rear surface of the plate member 50 changes from the fixed edge toward a distal side. The positions in which the light beams reach the light receiving elements 61, 62 of the photoelectric converting element array 60 shift from the above-described ones to positions 61a, 61b; 62a, 62b in FIG. 9.

Then, such variation quantities of the light beam reaching positions increase as the positions get remoter from the fixed edge, with the result that a 61a–62a interval is obviously different from a 61b–62b interval.

Namely, when employing the above-mentioned plastic material for the lens, there can not be avoided changes in terms of a curvature of the lens and an optical axis interval due to variations in the environment in use such as variations in the temperature and the humidity. As a result, this induces an error when detecting the focal point.

Especially, with respect to the influence by the above environmental changes, an electric circuit for analyzing the data about an image detects a temperature and a humidity and is capable of compensating them in principle.

In response to demands for down-sizing of the structure and improving the productivity, however, when the plastic lens is fixed by use of the adhesive agent, and if the environmental changes such as the changes in the temperature and humidity are repeated, a reproducibility of the dimension of the lens interval worsens, and the compensations of the temperature and the humidity by the data processing circuit do not work effectively. The reason for this is that the shape of the plastic lens is restricted by the adhesive agent, and the adhesive agent alters complicatedly with a passage of time due to the repetition of the environmental changes.

As a mechanism for solving such a problem, e.g., Japanese Patent Laid-Open Application No. 1-92709 has hitherto already proposed a construction for obviating a level-difference in the light quantity of the light beams penetrating the lenses and a configurational difference in distribution of the light quantity by projecting a pattern member light quantity distribution on a photoelectric converting element array, extracting an electric signal representing the pattern member light quantity distribution by calculating an initial value with this processing and compensate-converting a relative level of the thus extracted electric signal per array.

However, according to the construction disclosed in Japanese Patent Laid-Open Application No. 1-92709, when compensating the humidity, there are needed an element for making a comparison with the initial state and a compensating element. These elements have to be incorporated into the apparatus, and, therefore, a structure of the apparatus becomes intricate. This brings about problems in which not only a size of the hole apparatus increases, but also the arithmetic processing for effecting the compensation becomes complicated. It is required that some measures be taken to obviate these problems.

Further, with respect to the deformation of the plastic lens due to the change in the temperature in the problems given above, Japanese Patent Laid-Open Application Nos. 61-65711 and 61-165712 pay attention to a method of fixing the plastic lens and disclose techniques of fixing the plastic lens by using an adhesive agent so that the plastic lens is expandable and stretchable in a free state.

Moreover, with respect to the deformation of the plastic lens due to the change in the humidity, Japanese Patent Laid-Open Application No. 5-107062 proposes a technique of employing low-hygroscopicity plastic as a lens material.

There exists, however, a possibility to cause the following inconveniences when using the technique disclosed in Japanese Patent Laid-Open Application No. 61-165711 or 61-165712 in order to relieve the influence by the deformation of the plastic lens due to the change in the temperature and, at the same time, when employing the technique disclosed in Japanese Patent Laid-Open Application No. 5-107062 in order to relieve the influence by the deformation attributed to the change in the humidity.

More specifically, the polyolefin resinous material is suitable for use with, e.g., optical parts among the low-hygroscopicity plastic materials disclosed in Japanese Patent Laid-Open Application No. 5-107062. The polyolefin resinous material has an extremely low adhesive strength with the adhesive agent. Hence, according to the construction shown in FIG. 10 but disclosed in Japanese Patent Laid-Open Application Nos. 61-165711 and 61-165712, bosses 17, 18 protruding from a base body 13 are connected to the plastic plate 50 defined as a plate member only at tips of the bosses 17, 18 through an adhesive agent 1. Accordingly, a sufficient connecting strength between the plastic plate 50 and the bosses 17, 18 can not be obtained, and there dan not be avoided such a possibility that the plastic plate 50 comes off.

Note that numerals 55, 56 represent boss fitting holes formed in the plastic plate 50, the numeral 40 designates a stop plate (stop mask), the numeral 65 denotes a focus detection unit based on the above-mentioned photoelectric converting element array 60, the numeral 15 designates a transparent cover thereof, and 16 represents a rear cover in FIG. 10.

SUMMARY OF THE INVENTION

It is a primary object of the present invention, which was devised under such circumstances, to provide a lens fixing structure capable of obviating an instability of a positional accuracy due to environmental changes such as changes in temperature and humidity by obtaining an exact fixing method without increasing the number of parts even when forming a plate member having lenses by use of a material such as a plastic material exhibiting a low adhesion with an adhesive agent.

According to the lens fixing structure of the present invention, the plate member composed of the low-hygroscopicity plastic material, etc. is formed with at least a pair of lenses. The fitting holes are formed partly in the edge portions on both sides of the plate member, e.g., at two edges on the line of extension in the arranging direction of the pair of lenses among the lenses or in the vicinities of two edges of this plate member on the substantially vertical bisector with respect to the arranging direction of the pair of lenses among the plurality of lenses. At the same time, the base body for holding the plate member is provided with the bosses corresponding to the fitting holes of this plate member, and at least one of the bosses has the height enough to protrude from the surface of the plate member when attaching the plate member to the base body. The bosses of the base body that correspond to the fitting holes are inserted into the fitting holes of the plate member. The adhesive agent is coated astride on the side surface of at least one of the bosses protruding from the plate member and on the surface of the plate member, thus fixing the plate member to the base body.

According to the present invention, the plate member is fixed to the base body by attaching the stop plate to the base body, thereafter inserting the bosses protruding from the base body into the boss fitting holes and coating the adhesive agent astride on the side surface of at least one of these bosses and the surface of the plate member. At this time, the plate member and the stop plate are fixed in a state where the plate member and the stop plate are sandwiched between the base body and the adhesive agent.

Then, the adhesive agent is applied over the entire periphery of the side surface of the boss. Hence, the strength becomes greater than simply by coating the adhesive agent on the tip portions of the bosses and on the surface of the plate member as in the conventional structure.

Further, if a surface-directional dimension of the plate member varies because of the environmental changes, this plate member is fixed in the sandwiched state between the base body and the adhesive agent. However, the plate member itself is poor in terms of adhesion and therefore undergoes no influence by the adhesive agent with respect to this surface-directional variation. The plate member is freely stretchable within allowance ranges of the fitting portions between the boss fitting holes and the bosses.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 8:
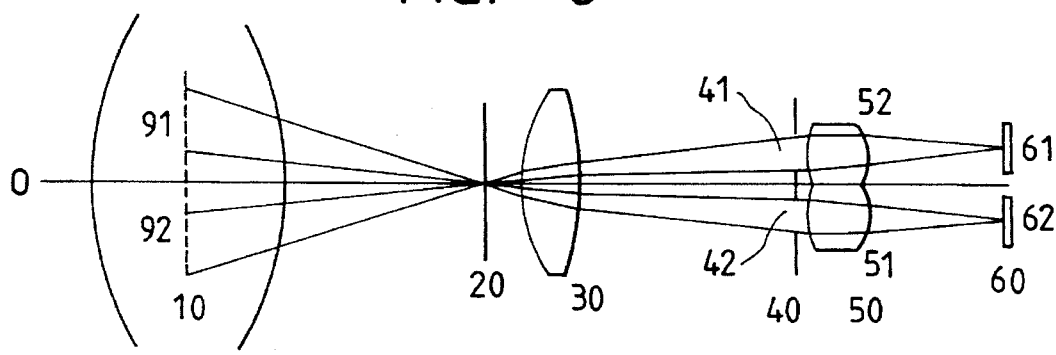
FIG. 8 is a schematic view showing the fundamental principle in the focus detection system suitable for an application of the present invention.
Figure 9:
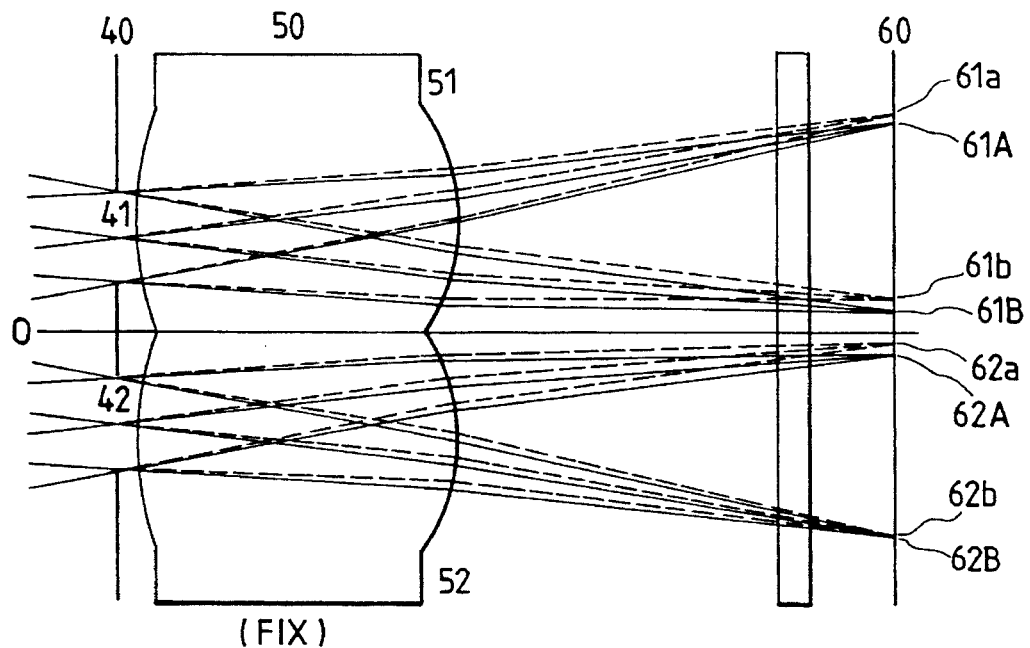
FIG. 9 is a schematic view of assistance in explaining an influence by a change in temperature on the focus detection.
Figure 10:
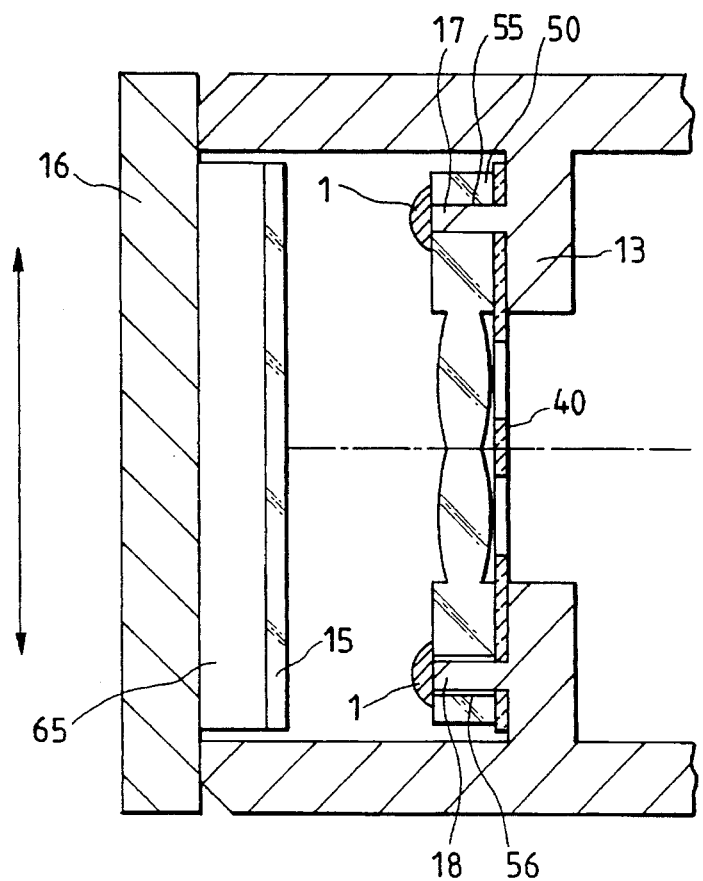
FIG. 10 is an enlarged sectional view, showing the principal portion, of assistance in explaining an example in the prior art.

FIGS. 1 through 4 illustrate one embodiment of a lens fixing structure according to the present invention. Referring to these Figures, the same or corresponding elements to those shown in FIGS. 8 to 10 are marked with the like numbers, and their detailed explanations will be omitted.

Figures 1, 2:
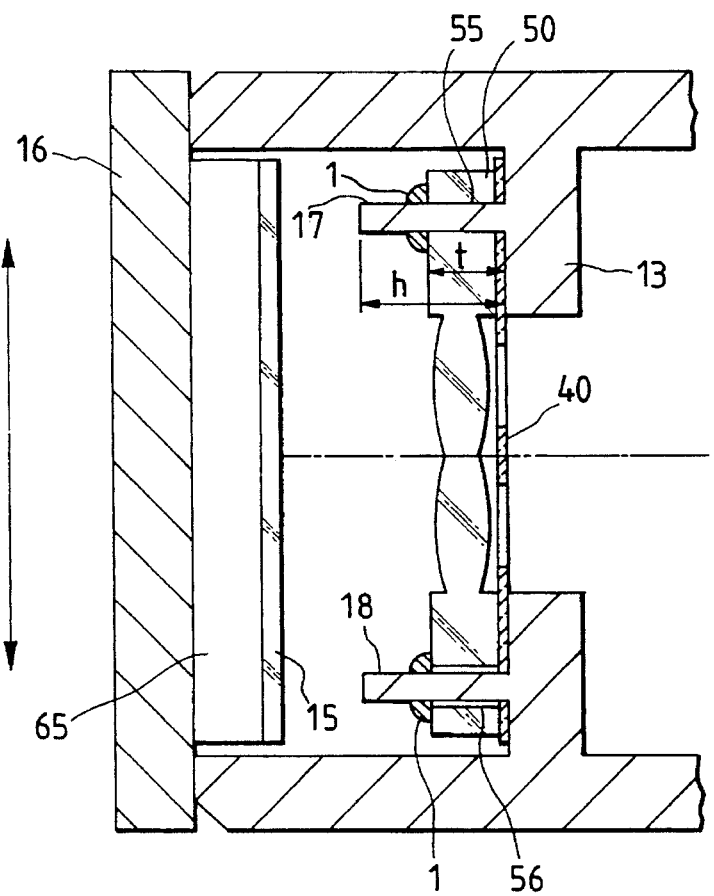
FIG. 1 is an enlarged sectional view illustrating the principal portion of one embodiment when a lens fixing structure according to the present invention is applied to a focus detection system in an optical system of a single-lens reflex camera.
FIG. 2 is a schematic sectional view of the optical system of the single-lens reflex camera including the focus detection system but illustrates one embodiment of the lens fixing structure according to this invention.
Figure 3:
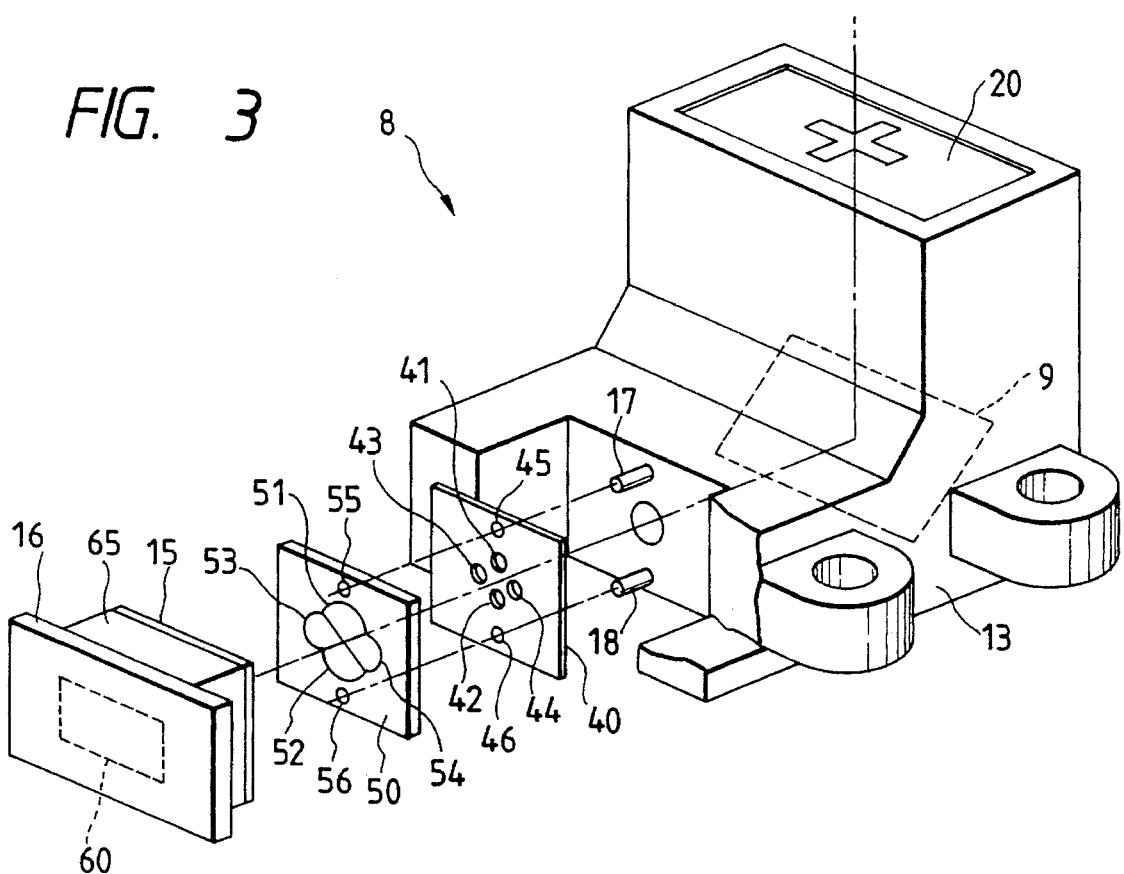
FIG. 3 is a schematic fragmentary perspective view of a construction of the principal portion but illustrates one embodiment of the lens fixing structure according to this invention.

Herein, FIGS. 3 end 4 illustrate an embodiment in which the present invention is applied to a focus detection unit 8 of FIG. 2. A base body generally designated by 13 in FIG. 3 incorporates an internal condenser lens 30 whose detailed illustration is omitted and a mirror 9 for deflecting an optical axis at a right angle.

Further, a stop plate (a stop mask; hereinafter referred to as a stop plate) 40 is, as obvious from FIG. 3, formed with four apertures 41, 42, 43, 44 corresponding to transparent plastic lenses 51, 52, 53, 54 of a plate-like member (hereinafter termed a transparent plastic plate) serving as a re-imaging lens.

Herein, the transparent plastic re-imaging lenses 51, 52, 53, 54 are integrally formed of a low-hygroscopicity plastic material, particularly a material (e.g., a polyolefin resinous material) exhibiting a low adhesion, thus constituting a single piece of transparent plastic plate (plate member) 50 as a product.

Also, boss fitting holes 55, 56 (hereinafter called boss holes) are formed in positions at both ends of this transparent plastic plate 50 in a direction where the pair of lenses 51, 52 are arranged.

Then, bosses 17, 18 are so formed corresponding to these boss holes 55, 56 as to protrude from the base body 13.

Based on such a configuration, the lens is assembled in such a way that the bosses 17, 18 are at first inserted into the holes 45, 46 formed at both ends of the stop plate 40, and, next, the boss holes 55, 56 of the transparent plastic plate 50 receive insertions of the bosses 17, 18.

Herein one of the boss holes 55, 56 as apparent from FIG. 1, etc., for ensuring a fitting positional accuracy, has substantially the same diameter as a diameter of the corresponding boss of the bosses 17, 18, and the other one is a hole elongated in the arranging direction of the bosses 17, 18, thereby further increasing a degree of stretching freedom with respect to the corresponding bosses.

Moreover, when the stop plate 40 and the transparent plastic plate 50 are superposed on each other to receive the insertions of the bosses 17, 18, as obvious from FIG. 1, the tips of the bosses 17, 18 protrude from the transparent plastic plate 50.

More specifically, a height h of at least one of the bosses 17, 18 protruding from the base body 13 is larger than a sum t of a thickness of the plastic plate 50 and a thickness of the stop plate 40. Then, after the stop plate 40 and the plastic plate 50 have been attached to the base body 13, the bosses 17, 18 are also protrudable from the plastic plate 50.

In this state, an adhesive agent 1 is coated astride on the side surfaces of the bosses 17, 18 protruding from the transparent plastic plate 50 as well as on the transparent plastic plate 50. This adhesive agent 1 employed herein is of such a type as to exhibit a relatively high viscosity. Particularly when using the adhesive agent 1 of the high-viscosity type, the adhesive agent 1 does not permeate between the bosses 17, 18 and the boss holes 55, 56, resulting in a preferable state.

Then, after hardening the adhesive agent 1, a rear cover 16 of a focus detection unit 65 is fixedly secured to the base body 13, thus finishing the assembly.

Note that the rear cover 16 is fitted to a photo sensor array (photoelectric converting element array) 60 serving as a focus detecting element and a transparent cover 15 for covering the entire surface thereof.

Figure 4:
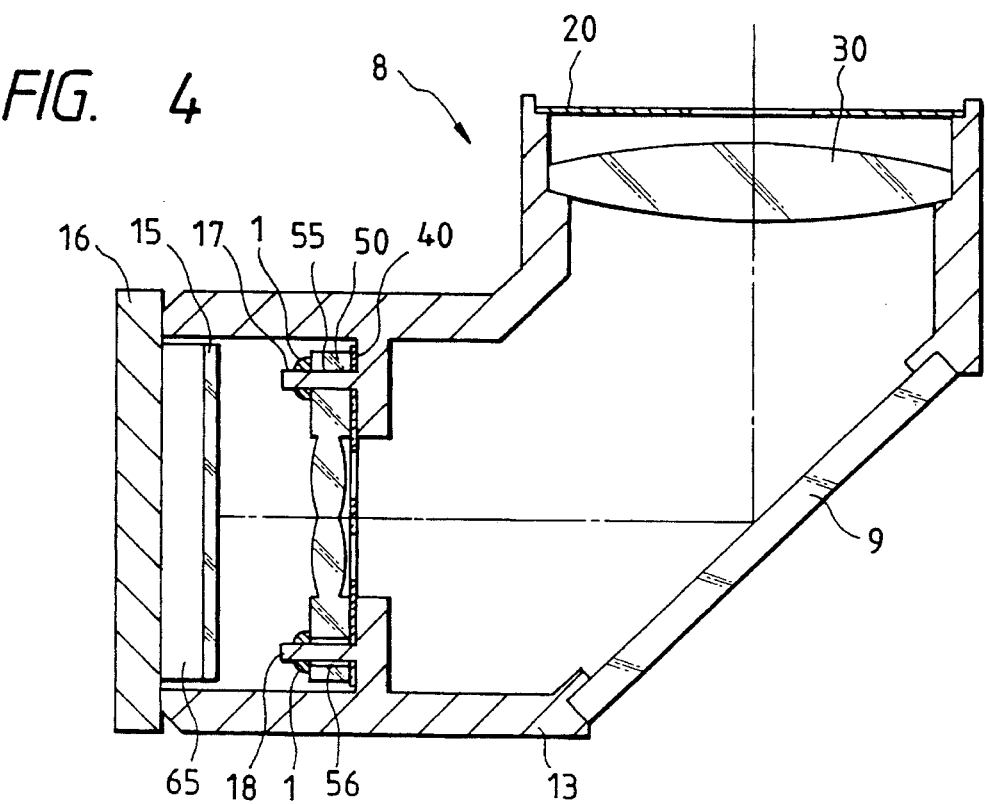
FIG. 4 is a schematic sectional view of a focus detection unit but illustrates one embodiment of the lens fixing structure according to this invention.

Herein, FIG. 4 is a sectional view illustrating the thus-assembled-state.

Then, according to such a configuration, the transparent plastic plate 50 is fixed to the base body 13 as follows. As apparent from FIG. 1, etc., after the stop plate 40 has been attached to the base body 13, the bosses 17, 18 protruding from the base body 13 penetrate the respective boss holes 55, 56. The adhesive agent 1 is coated astride on the side surface of at least one boss 17 or 18 of these bosses 17, 18 as well as on the surface of the transparent plastic plate 50. At this time, it follows that the transparent plastic plate 50 and the stop plate 40 are fixed in a state where these plates are sandwiched between the base body 13 and the adhesive agent 1.

In this instance, the adhesive agent 1 is coated over the entire peripheries of side surfaces of the bosses 17, 18, and therefore the strength becomes larger than simply by applying the adhesive agent on the tips of the bosses and the surface of the transparent plastic plate as in the conventional structure.

Further, if there varies a surface-directional dimension of the transparent plastic plate 50 as indicated by arrows in FIG. 1 due to the environmental changes, this transparent plastic plate 50 is fixed in a sandwiched-state between the base body 13 and the adhesive agent 1. The transparent plastic plate 50 itself is, however, weak in terms of its adhesion and therefore undergoes no influence by the adhesive agent 1 with respect to a variation in the arrowed direction. The transparent plastic plate 50 is freely stretchable within allowance ranges defined by the fitting areas between the boss holes 55, 56 and the bosses 17, 18.

Figure 5:
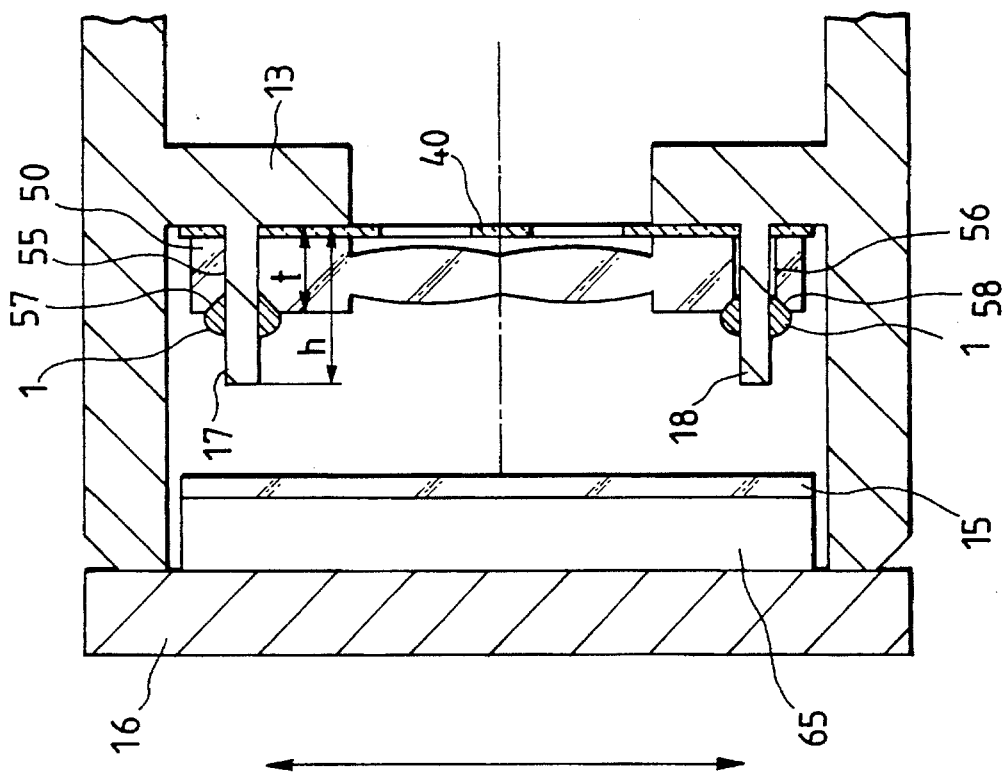
FIG. 5 is an enlarged sectional view of the principal portion but illustrates another embodiment of the lens fixing structure according to this invention.
Figure 6:
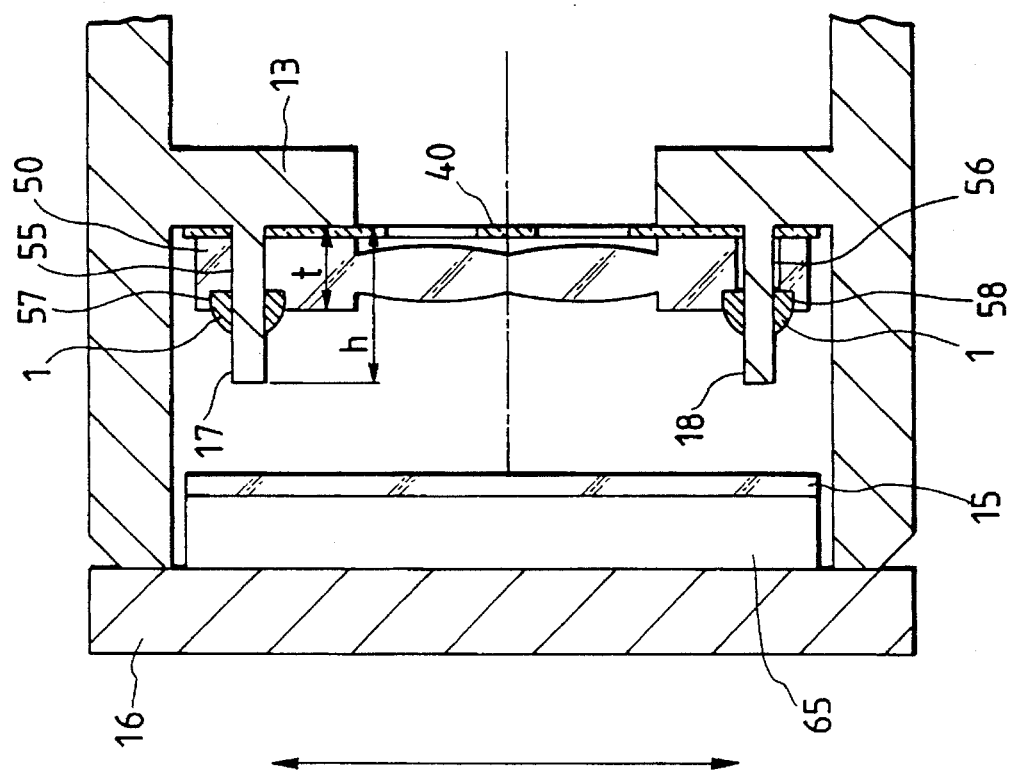
FIG. 6 is an enlarged sectional view of the principal portion but illustrates still another embodiment of the lens fixing structure according to this invention.
Figure 7:
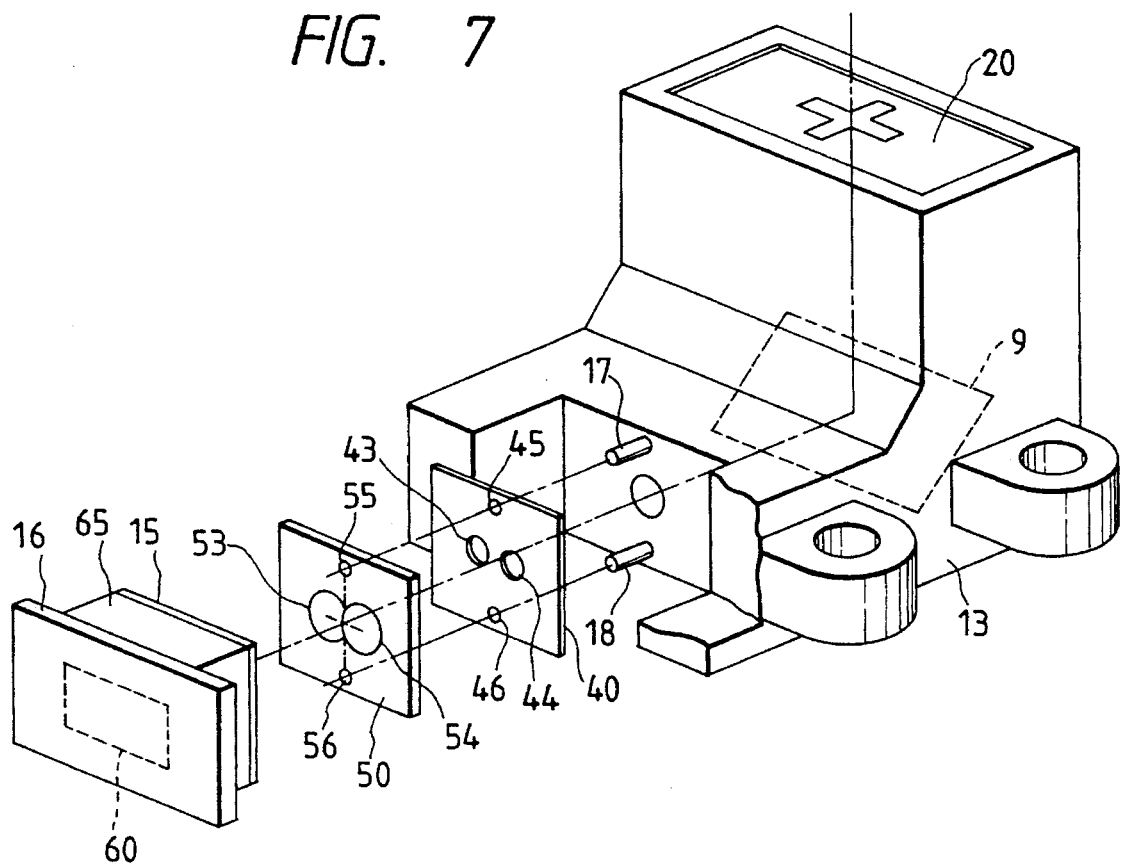
FIG. 7 is a schematic sectional view of the focus detection system but illustrates a further embodiment of the present invention.

FIGS. 5, 6 and 7 illustrate other embodiments of the present invention.

That is, in the embodiment of FIG. 5, counterbores 57, 58 each assuming a substantially cylindrical shape are formed as adhesive agent banks in the vicinities of the peripheries of the boss holes 55, 56 of the transparent plastic plate 50, thereby preventing a wider diffusion of the adhesive agent 1 than needed.

Further, the embodiment of FIG. 6 provides another example of the counterbore of FIG. 5, wherein countersinks 57, 58 are formed.

When the above counterbores or countersinks 57, 58 are formed, in the transparent plastic plate 50 having at least the lenses 51, 52, a thickness in the vicinity of the periphery of at least one of the boss holes 55, 56 can be made smaller than thicknesses of other portions exclusive of the lens elements 51, 52. It follows from the above-elucidated reason that a well-fixed state can be obtained by the adhesive agent 1.

Moreover, in accordance with this embodiment, the boss holes 55, 56 and the bosses 17, 18 are provided in the positions at both ends of the transparent plastic plate 50 in the arranging direction of the lenses 51, 52 thereof. The formations thereof are not, however, confined to these positions. In the transparent plastic plate 50, the boss holes 55, 56 and the bosses 17, 18 may be, as a matter of course, provided in positions at both ends in an arranging direction of not the lenses 51, 52 but another pair of lenses 53, 54.

Further, as depicted in FIG. 7, the transparent plastic plate 50 is formed integrally with a plurality of lenses. The boss holes 55, 56 are formed in the vicinities of both edges of the above plate member on a substantially vertical bisector with respect to the arranging direction of a pair of lenses among lenses of the transparent plastic plate 50. At the same time, as a matter of course, the bosses 17, 18 may be so provided corresponding to the boss holes 55, 56 as to protrude from the base body 13 using a material adherable with the adhesive agent.

Especially, according to such a configuration of the present invention, even when the transparent plastic plate 50 defined as a plate member is deformed due to the environmental changes in the temperature and the humidity, the plastic plate 50 itself has the poor adhesion and therefore undergo no influence by the adhesive agent 1 against the deformation. The plastic plate 50 is freely stretchable within the fitting allowance ranges of the boss holes 55, 56. When requiring the compact configuration and the positional accuracy as in the case of the focus detecting device of the camera or the like, it is possible to ensure the preferable accuracy against the changes in the ambient environment, especially in the temperature and the humidity as well.

In addition, the counterbores 57, 58 serving as the adhesive agent banks are formed in the vicinities of the peripheries of the boss holes 55, 56 of the plastic plate 50, thereby preventing the wider diffusion of the adhesive agent 1 than needed. A good workability can be also ensured.

Then, if constructed in this way, the plastic lens 50 exhibiting the low adhesion with the adhesive agent 1 can be surely fixed without increasing the number of parts, and there can be obviated an instability of the positional accuracy the to the environmental changes.

Note that the present invention is not limited to the structures shown in the above-discussed embodiments, but the shapes and structures of the respective portions may adequately take, as a matter of course, variant forms and modifications. For example, a variety of examples of the variant form can be considered when adequately varying and modifying the shapes and the constructions of the respective portions in the embodiments given above.

Also, the present invention is not restricted to the transparent plastic plate 50 defined as the plate member constituting the re-imaging lens in the focus detection unit 8 as discussed in the above embodiments. There will be considered a variety of examples of the variant form suitable for the application to the fixing structure of fixing the plastic plate member.

As discussed above, according to the lens fixing structure of the present invention, the plate member composed of, e.g., the low-hygroscopicity plastic material, etc. is formed with at least a pair of lenses. The fitting holes are formed partly in the edge portions on both sides of the plate member, e.g., at two edges on the line of extension in the arranging direction of the pair of lenses among the lenses or in the vicinities of two edges of this plate member on the substantially vertical bisector with respect to the arranging direction of the pair of lenses among the plurality of lenses. At the same time, the base body for holding the plate member is provided with the bosses corresponding to the fitting holes of this plate member, and at least one of the bosses has the height enough to protrude from the surface of the plate member when attaching the plate member to the base body. The bosses of the base body that correspond to the fitting holes are inserted into the fitting holes of the plate member. The adhesive agent is coated astride on the side surface of at least one of the bosses protruding from the plate member and on the surface of the plate member, thus fixing the plate member so that this plate member is sandwiched between the base body and the adhesive agent. The construction is thus simple, and, nevertheless, a variety of excellent advantages which will be given as follows are exhibited.

That is, according to the present invention, the fixation of the plate member to the base body involves inserting the bosses protruding from the base body into the boss fitting holes and coating the adhesive agent astride on the side surface of at least one of these bosses as well as on the surface of the plate member. At this time, the plate member is fixed in the sandwiched state between the base body and the adhesive agent and can be therefore surely fixed adequately surely with an increase in the strength.

That is, according to the present invention, the adhesive agent is coated over the entire peripheries of the side surfaces of the bosses, and this yields the advantage that the strength becomes greater than simply by applying the adhesive agent on the tip portions of the bosses and the surface of the plate member as in the case of the conventional structure.

Further, according to the present invention, if the surface-directional dimension of the plate member varies because of the environmental changes, this plate member is fixed in the state where the plate member is sandwiched between the base body and the adhesive agent. The plate member itself is poor in terms of the adhesion and is not therefore influenced by the adhesive agent with respect to the surface-directional variation. The plate member is freely stretchable within the allowance ranges of the fitting portions between the boss fitting holes and the bosses.

Moreover, according to the present invention, the influence by the deformation of the lens due to the humidity is relieved. For this purpose, the plate member having the lenses is composed of a material exhibiting a poor adhesion with the adhesive agent, e.g., polyolefin resinous material among the low-hygroscopicity plastic materials. In this case also, the certain fixation can be attained without increasing the number of parts, and, besides, the instability of the positional accuracy because of the environmental changes can be obviated.

Also, according to the present invention, for relieving the influence by the deformation of the lens due to the humidity, the lens is composed of the material showing the poor adhesion with the adhesive agent among the low-hygroscopicity plastic materials. In this case, even if the plate member having the lenses is deformed by the environmental changes, the plate member itself is weak in terms of the adhesion and therefore undergo no influence by the adhesive agent against the deformation. The plate member is freely stretchable within the allowance ranges in the fitting state of the boss fitting holes. In the case of requiring the compact configuration and the positional accuracy as in the focus detecting device of the camera or the like, there is exhibited an advantage in which the preferable accuracy against the changes in the ambient environment, especially in the temperature and the humidity can be ensured.

In addition, according to the present invention, the cylindrical counterbore, the countersink and the counterbore each serving as the adhesive agent bank are provided at the thick plate portion in the vicinity of the periphery of at least one fitting hole, e.g., along the periphery of the fitting hole or directly at the fitting hole of the plate member having the pair of lenses. Thus, it is possible to prevent the wider diffusion and ensure the good workability.

It is apparent that, in this invention, a wide range of different working modes can be formed based on the invention without deviating from the spirit and scope of the inventions. This invention is not restricted by its specific working modes except being limited by the appended claims.

What is claimed is:

1. A structure of fixing a lens, comprising:

a base body having a protruding member penetrating the lens and extending therethrough so that a portion of the protruding member extends outward from the lens, the portion having an end and side surfaces extending beyond the lens, for supporting the lens; and attaching means, provided at the side surfaces of said portion of said protruding member extending beyond the lens, for attaching the lens to said base body, and for regulating movement in an optical-axis direction of the lens with respect to said base body but permitting a movement in a direction orthogonal to the optical axis of the lens caused by changes in shape of the lens.

2. A structure of fixing a lens member having a pair of lens elements and a plate member connected to said lens elements, said plate member being formed with at least two fitting holes, said structure comprising:

a base body for holding said plate member, said base body having at least two boss members inserted into said fitting holes, at least one of said boss members being an elongate boss member having a height enough to protrude from the surface of said plate member; and an adhesive agent coated on the side surface of said elongate boss member protruding beyond the surface of said plate member, and on the surface of said plate member, after inserting said corresponding boss member of said base body into said fitting hole of said plate member.

3. A fixing structure according to claim 2, wherein said elongate boss member is, after hardening said adhesive agent, relatively unmovable with respect to said adhesive agent, but the surface of said plate member is relatively movable with respect to the said adhesive agent.

4. A fixing structure according to claim 2, wherein said fitting holes of said plate member are formed at two edges on the line of extension in an arranging direction of said pair of lens elements of said lens member.

5. A fixing structure according to claim 2, wherein said fitting holes of said plate member are formed in the vicinities of two edges of said plate member on a substantially vertical bisector in an arranging direction of said pair of lens elements among a plurality of lens elements of said lens member.

6. A fixing structure according to claim 2, wherein said plate member is formed of a low-hygroscopicity plastic material.

7. A fixing structure according to claim 6, wherein the low-hygroscopicity plastic material is a polyolefin resinous material.

8. A fixing structure according to claim 2, wherein said plate member is formed of a material to which said adhesive agent is hard to adhere.

9. A fixing structure according to claim 2, wherein a thickness of said plate member along the periphery of said fitting hole is smaller than those of the portions exclusive of said fitting hole.

10. A fixing structure according to claim 9, wherein a cylindrical counterbore is formed along the periphery of said fitting hole of said plate member.

11. A fixing structure according to claim 9, wherein a conical counterbore is formed along the periphery of said fitting hole of said plate member.

12. A fixing structure according to claim 2, wherein a diameter of at least one of said fitting holes of said plate member is slightly larger than a diameter of said boss member corresponding thereto in the arranging direction of said fitting holes.

13. A structure for fixing a lens holder to a base body, comprising:

a lens holder for holding a lens which has an optical axis, the lens holder member having a boss fitting hole therein;

a base body having a boss thereon which extends through the boss fitting hole of the lens holder with a clearance existing between the boss and the boss fitting hole, a portion of the boss extending beyond the boss fitting hole and having an end and side surfaces extending from the end, the end extending farther beyond the boss fitting hole than the side surfaces; and an adhesive for connecting the side surfaces of the portion of the boss to the lens holder to regulate movement in the optical axis direction of a lens held by the lens holder and to permit movement of the lens in a direction orthogonal to the optical axis of the lens caused by changes in shape of the lens.

* * * * *